March 7, 1972   J. P. COFFEY   3,647,553
INTERCELL CONNECTION FOR STORAGE BATTERIES
Filed June 22, 1970

INVENTOR.
JAMES P. COFFEY

United States Patent Office 3,647,553
Patented Mar. 7, 1972

3,647,553
INTERCELL CONNECTION FOR STORAGE BATTERIES
James P. Coffey, Hatboro, Pa., assignor to ESB Incorporated
Filed June 22, 1970, Ser. No. 47,988
Int. Cl. H01m 5/00
U.S. Cl. 136—134 R
9 Claims

ABSTRACT OF THE DISCLOSURE

The internal connection between cell elements of a multi-cell storage battery is effected by forcing and rotating a metallic connector member through a metallic extension of a first cell element, through the intercell partition and into a metallic extension of the second cell element. In so doing, the metal of the insert is thermally fused to the metal of the two metallic extensions.

BACKGROUND OF THE INVENTION

(1) Field of the invention

This invention relates to storage batteries. More particularly, it relates to the internal connections between electrode groups.

(2) Description of the prior art

It has long been recognized in the storage battery art that the shorter the electrical path between cells, the less power will be wasted from resistive effects. Likewise, with a shorter path, less material is needed to complete the electrical path thereby effecting direct material savings. The shortest path for an electrical connection between cells is directly through the usual cell partitions separating adjacent cells. Batteries employing this direct path have been built for many years. The principal types of connections used have been rivets or electrical welds made through the partition between extensions of the plate straps. It is necessary with these to provide a hole through the cell partition in an accurately located position and this becomes a extra operation to the battery manufacturer. Riveted connections are reported to have failed causing internal battery explosions.

SUMMARY OF THE INVENTION

In accordance with this invention, the straps of adjacent cells in a multicell storage battery are formed with vertical extensions adjacent to the partition separating the two cells. A conical metallic insert mounted on a moveable rotatable tool is forced through the first extension, through the cell partition and into the second extension. In this operation, metallic fusion of both the rotating insert member and the two metallic extensions occurs which results in a welded bond between the extensions and the insert. A hot melt type sealing material may be used to improve the weld and seal the opening made by the insert through the partition.

DESCRIPTION OF THE PREFERRED EMBODIMENTS

Wherever possible, like parts will be referred to by the same identifying number in the several figures.

Figure 1:
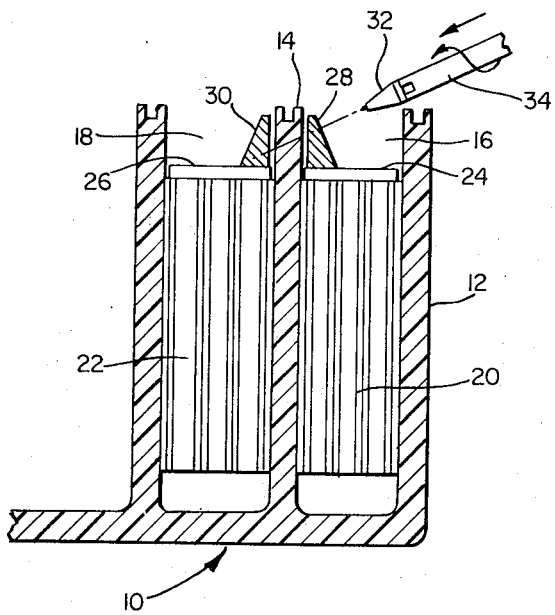
FIG. 1 shows a section of a lead acid battery.

In FIG. 1. 10 represents a cross section of a battery container, 12 is an end wall and 14 represents an interior partition. 16 and 18 represent two adjacent cell cavities in container 10. Element 20 is located in cavity 16 and element 22 in cavity 18. Strap 24 connects together a group of plates from element 20 and strap 26 connects together a group of plates from element 22. Strap 24 is provided with an extension 28 adjacent to one side of partition 14 and strap 26 is provided with an extension 30 adjacent to the other side of partition 14. A conical insert 32 is shown mounted on a rotatable translatable mandrel 34.

Figure 2:
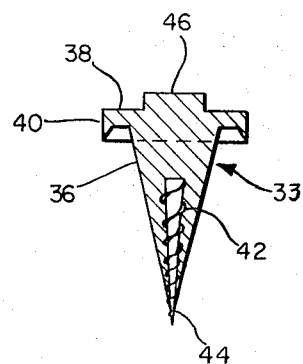
FIG. 2 shows a view of an insert prior to making the connection that forms the basis of this invention.

FIG. 2 shows an enlarged cross section of a modified insert 33. This insert is made of a lead alloy. It is to be noted that the insert is comprised of a conical body portion 36, a flange portion 38 and a sharp-edged collar 40 at the outer edge of the flange 38. A steel piece 42 is embedded in the end of insert 33. The steel piece 42 is sharpened at the point to a cutting edge so that it is in effect a drill as shown at 44 although the exact shape of the point is not critical. The surface of the steel piece is roughened to improve its hold in the insert and in FIG. 2 the roughening takes the form of a coarse external thread such as might be found on a wood screw. On the surface of the flange 38 away from the conical member 36, a driving boss 46 is formed. This may be triangular, square, hexagonal, or other shape suitable for transmission of a rotary motion.

In order to make the connection that forms the invention, insert 32, mounted on tool 34, is rotated at a high speed and forced into the extension 28 of strap 24, the cell partition 14 and into the extension 30 of strap 26. The forward motion of the insert is halted in the case of a type 33 insert, when flange 38 and collar 40 are partially embedded in the metal of extension 28. Because of the high rotational speed given to insert 33, frictional heat is developed. This is sufficient to cause the cell partition 14 to soften and it is pushed out of the way of the advancing cone 36. Where cone 36 comes in contact with the two metallic extensions 28 and 30, the metal of both the insert and the two extensions is raised to the melting point, resulting in a friction weld.

It is to be observed that in order to allow the mandrel 34 to clear the lip of container 12, it is necessary that the axis of the mandrel not be perpendicular to the surface of partition 14. The exact amount that the axis must depart from the perpendicular will depend upon the geometry of the particular battery being assembled. In order to keep the insert from moving transversely to its axis during the insertion operation, it is desirable that the surface 29 of extension 28 be perpendicular to the axis of mandrel 34.

Figure 3:
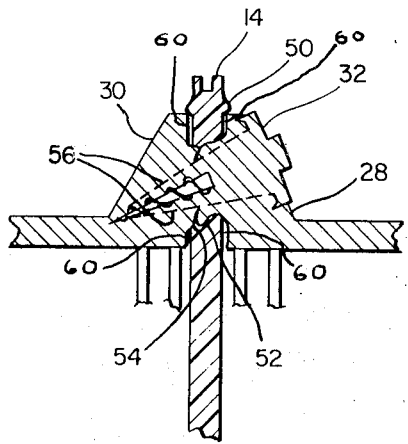
FIG. 3 shows a portion of the same section after the connection has been made in accordance with the invention.

FIG. 3 is a cross section of the completed connection. At 50 is shown a bulge of partition material forced out by the forcing of insert 33 through portion 14. At 52, a flow of metal from extension 28 is shown and at 54 is shown a reverse flow of metal from extension 30. Dotted line 56 indicates the approximate location and extent of the friction welded jointure areas between insert 33 and extensions 28 and 30.

In early testing, it was found that when an insert without flange 38 and collar 40 as shown at 32 in FIG. 1 was forced into the surface of extension 28, metal from the latter tended to flow in a direction opposite to the translational motion of 32 and then to fly off of the body of 32. Under some circumstances, this could be objectionable. However, the addition of collar 38 and flange 40 as shown in FIG. 2 was found to contain this displaced metal.

Figure 4:
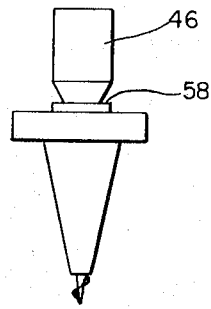
FIG. 4 illustrates a second embodiment of the insert in accordance with the invention.

A further refinement to the design of the insert is shown in FIG. 4. Here the driving boss 46 is extended.

It has a necked-in area as shown at 58. The size of 58 is chosen so that it will shear off when the flange and collar become embedded in extension 28 due to the sudden increase in torque therefrom.

It has been further found that with certain container materials and in particular when the container is made from polypropylene, the seal may not be entirely liquid tight. A hot melt sealing material 60 applied between the partition 14 and the strap extensions 28 and 30 corrects this condition. In particular, it has been found that a three-component hot melt compound composed of equal parts of natural resinous acid, an aliphatic hydrocarbon wax, and ethylene isobutyl acrylate co-polymer acts both as a flux to improve the welding of the metal parts and as a sealant.

EXAMPLE

By way of example, a tool with insert mounted thereon similar to that shown in FIG. 2 was applied to a battery assembly to produce the configuration shown in FIG. 3. The speed of rotation required was 5000 revolutions per minute and the maximum force required to force the insert through the first strap extension, through the partition and into the second strap extension was in the order of 1500–2000 lbs. In this test, a three-component hot melt sealing material was placed on the inner surfaces of the two strap extensions. The connection so made was low in electrical resistance and liquid tight.

Although a particular example of my invention has been described, the invention is not to be limited to the exact construction shown and described. Various changes and modifications may be made without departing from the spirit and scope of the invention as defined in the appended claims.

Having fully described my invention and given an example of its fulfillment, I hereby claim:

1. In a storage battery having a container, a plurality of cell compartments therein, cell partitions defining each compartment, cell elements in adjacent cell compartments, each element comprised of plate groups and separators and metallic straps attached to the plate group, the improvement comprising:
    (a) metallic extensions of the straps contiguous to a cell partition; and
    (b) a conical intercell connector insert traversing a first strap extension and an adjacent cell partition and entering into a second strap extension, the jointure of insert and extension characterized by homogeneous weld areas therebetween.

2. A storage battery as defined in claim 1 in which the conical insert has a flange at the base thereof and a dependent collar on the flange, the collar and the flange being partially embedded in the first strap extension.

3. A storage battery as defined in claim 2 in which the conical insert has a steel piece embedded on its axis.

4. A storage battery as defined in claim 1 in which a hot melt sealing compound is located in the interstices between the extensions of the straps and the cell partition.

5. A method for interconnecting the cells of a lead acid storage battery of the type comprising a container having at least two cell compartments therein, a partition member separating the cell compartments, cell elements in each compartment, each cell element having positive and negative plates with separators therebetween, the positive plates being connected by a positive strap and the negative plates being connected by a negative strap and extentions formed on chosen straps contiguous to the partitions comprising:
    rotating and forcing the end of a metallic insert through an extension of one of the straps, through the partition member and embedding said end in the extension of another one of the straps.

6. A method for interconnecting the cells of a battery as defined in claim 4 in which the insert has a drive member protruding therefrom and the rotating of the insert is continued to the breaking point of the drive member.

7. A method for interconnecting the cells of a battery as defined in claim 4 in which areas of jointure between the insert and the strap extensions are heated above their melting points by the energy of rotation of the insert.

8. A method for interconnecting the cells of a lead acid storage battery of the type comprising a container having at least two cell compartments therein, a partition member separating the cell compartments, cell elements in each compartment, each cell element having positive plates and negative plates with separators therebetween, the positive plates being connected by a positive strap of lead composition and the negative plates being connected by a negative strap of lead composition, extensions formed on chosen straps contiguous to the partition and a coating of hot melt adhesive material located in the interstice between the strap extensions and the partition which comprises:
    rotating and forcing the end of a lead composition insert having an emergent steel point on the axis thereof through the extension of one of the straps, through the partition member and embedding said end in the extension of a second strap.

9. A method as defined in claim 8 in which the speed of rotation of the insert is approximately 5000 revolutions per minute and the force for forcing the insert is within the range of approximately 1500 to 2000 lbs.

References Cited

UNITED STATES PATENTS 1,934,945   11/1933   Merlau et al. _____ 136—134 R
3,515,597   6/1970    Barnes et al. _____ 136—134 R DONALD L. WALTON, Primary Examiner U.S. Cl. X.R.

29—470.3; 136—176